United States Patent [19]

Hensley, Jr. et al.

[11] 3,846,342

[45] Nov. 5, 1974

[54] CATALYST CONTAINING AN OXIDE OF TECHNETIUM AS A PROMOTER

[75] Inventors: Albert L. Hensley, Jr., Munster; Thomas D. Nevitt, Valparaiso, both of Ind.

[73] Assignee: Standard Oil Company, Chicago, Ill.

[22] Filed: Aug. 31, 1972

[21] Appl. No.: 285,302

Related U.S. Application Data

[63] Continuation of Ser. No. 127,808, March 24, 1971, abandoned.

[52] U.S. Cl.................. 252/465, 252/461, 208/136
[51] Int. Cl.............................................. B01j 11/08
[58] Field of Search ............ 252/461, 465; 208/136

[56] References Cited
UNITED STATES PATENTS

| 3,114,967 | 12/1963 | Bourne et al. | 252/465 X |
| 3,179,602 | 4/1965 | Gremillion | 252/465 |
| 3,383,306 | 5/1968 | Rogers et al. | 252/465 X |
| 3,574,092 | 4/1971 | Mitsche | 208/138 X |

Primary Examiner—Daniel E. Wyman
Assistant Examiner— Shine
Attorney, Agent, or Firm—James L. Wilson; Arthur G. Gilkes; William T. McClain

[57] ABSTRACT

The catalyst comprises a component having hydrogenation-dehydrogenation activity, a suitable support, and as a promoter a small amount of technetium. The support may comprise alumina and the component having hydrogenation-dehydrogenation activity and dehydrocyclization activity may be a Group VIII noble metal or a metal from Group VIA of the Periodic Table of Elements. The small amount of technetium is about 0.01 to about 2 weight percent, based on the weight of the catalyst.

The process comprises contacting a petroleum hydrocarbon stream in a reforming zone under suitable reforming conditions and in the presence of hydrogen with a catalyst of the invention.

6 Claims, No Drawings

CATALYST CONTAINING AN OXIDE OF TECHNETIUM AS A PROMOTER

CROSS-REFERENCE TO RELATED APPLICATION

This application is a continuation application of U.S. Ser. No. 127,808, which was filed on Mar. 24, 1971 and is now abandoned.

BACKGROUND OF THE INVENTION

One of the important petroleum refining processes that are employed to provide high-octane-number hydrocarbon blending components for gasoline is the reforming process. In the typical reforming process, aromatics are produced by means of (1) the dehydrogenation of six-carbon-member-ring naphthenes, (2) the isomerization of five-carbon-member-ring naphthenes to six-carbon-member-ring naphthenes, and the subsequent dehydrogenation of the six-carbon-member-ring naphthenes, and (3) the dehydrocyclization of paraffinic hydrocarbons to aromatics.

Petroleum naphthas and gasoline-boiling range hydrocarbons are converted in the typical reforming process in the presence of various catalysts. Typical of these catalysts are chromium-oxides-on-alumina catalysts, molybdenum-oxides-on-alumina catalysts and platinum-on-alumina catalysts. The platinum-on-alumina catalysts may contain also alumino-silicate materials and/or a halide. In the past, the catalysts that have been most frequently employed in the reforming process by the petroleum refining industry have been the platinum-containing catalysts.

There has now been found an improved catalytic composition for the reforming of petroleum hydrocarbon streams to produce much higher octane number products. The catalyst, when employed in the reforming of petroleum hydrocarbons, provides high activity and selectivity and contains as a promoter a small amount of technetium.

SUMMARY OF THE INVENTION

Broadly, according to the present invention, there is provided a catalytic composition for the reforming of petroleum hydrocarbon streams which catalytic composition comprises a component having hydrogenation-dehydrogenation activity and dehydrocyclization activity, a suitable support, and as a promoter a small amount of technetium. This small amount of technetium may be present in an amount of about 0.01 to about 2 weight percent, based on the weight of the catalytic composition. The support comprises a catalytically active alumina and may comprise also an aluminosilicate material. The component having hydrogenation-dehydrogenation activity and dehydrocyclization activity is a member selected from the group consisting of a Group VIII noble metal, compounds of a Group VIII noble metal, one or more metals of Group VIA, compounds of one or more metals of Group VIA, and combinations thereof. A preferred Group VIII noble metal is platinum. A preferred Group VIA metal is chromium. When the catalyst contains oxides of chromium, it may contain also a member selected from the group consisting of the oxide of an alkali metal, an oxide of an alkaline earth metal, and mixtures thereof. If the catalyst contains a Group VIII noble metal, it may contain also a halide and/or an aluminosilicate material. A preferred suitable support comprises a catalytically active alumina.

According to the present invention there is provided an improved process for reforming a petroleum hydrocarbon stream to obtain a product having a high-octane number, which process comprises contacting said hydrocarbon stream in a reforming zone under suitable reforming conditions and in the presence of hydrogen with an embodiment of the catalytic composition of the present invention.

DESCRIPTION AND PREFERRED EMBODIMENTS

The highly mechanized society of today requires an increasing demand for motor fuels having very-high-octane numbers. One of the sources of such high octane numbers comprises aromatics resulting from the reforming of petroleum hydrocarbon fractions. Such aromatics can be obtained by both the dehydrogenation of the naphthenes in the petroleum hydrocarbon fractions and the dehydrocyclization of paraffins. There has now been found an improved catalytic composition for the reforming of petroleum hydrocarbon streams. This catalytic composition comprises a component having hydrogenation-dehydrogenation activity, a suitable support, and a small amount of an oxide of technetium as a promoter.

The component having the hydrogenation-dehydrogenation activity and dehydrocyclization activity comprises a member selected from the group consisting of a noble metal of Group VIII of the Periodic Table of Elements, compounds of a Group VIII noble metal, one or more metals of Group VIA of the Periodic Table of Elements, compounds of one or more metals of Group VIA, and combinations thereof. The Periodic Table of Elements considered herein is found on page 2 of MODERN ASPECTS OF INORGANIC CHEMISTRY, written by H. J. Emeleus and J. S. Anderson and published by D. Van Nostrand Company, Inc., New York, New York (1949). The Group VIII noble metals include platinum, palladium, rhodium, iridium, ruthenium, and osmium. The preferred Group VIII noble metal is platinum. If the component having hydrogenation-dehydrogenation activity and dehydrocyclization activity is a Group VIII noble metal, it is present in an amount within the range of about 0.05 to about 2 weight percent, based on the weight of the catalyst. Molybdenum and chromium are metals of Group VIA of the Periodic Table of Elements that may be employed in the catalytic composition of the present invention. Chromium is the preferred Group VIA metal and may be present in an amount within the range of about 5 to about 25 weight percent, calculated as $Cr_2O_3$ and based on the weight of the catalyst.

Suitable supports that may be employed in the catalytic composition of the present invention are catalytically active alumina, acid-treated aluminas, silica-stabilized alumina containing up to 15 weight percent silica, and composites of catalytically active alumina and the oxides of titanium and/or zirconium.

Excellent support material for the catalytic composition of the present invention is a catalytically active alumina. It is preferred that the catalytically active alumina have a large pore diameter. Such large-pore-diameter aluminas should possess a surface area of about 100 to about 800 square meters per gram. The average pore diameter should be within the range of about 70 to about 200 Angstrom units (A), suitably within the range of about 125 to about 180 A, and preferably within the range of about 135 to about 160 A. The surface area of such large-pore-diameter aluminas will fall advantageously within the range of about 150 to about 500 square meters per gram, suitably within the range of about 200 to about 300 square meters per gram.

Suitable aluminas can be purchased from manufacturers of catalysts. For example, NALCO 471 aluminas are available from the Nalco Chemical Company. These aluminas can be obtained with pore volumes from as low as 0.54 cubic centimeters per gram to as high as 2.36 cubic centimeters per gram and average pore diameters within the range of about 72 to about 305 A. Therefore, those NALCO 471 aluminas which have the desired physical properties are suitable for use as the support of the catalytic composition of the present invention. In addition, suitable aluminas can be obtained from the American Cyanamid Company. For example, a typical sample of American Cyanamid's Aero-100 extrudate was found to have an average pore diameter of 138 A and a surface area of 178 square meters per gram. While the preferred aluminas are the large-pore-diameter aluminas, aluminas having pore diameters that are less than 70 A may be used in the catalytic composition of the present invention.

The support may comprise also a large-pore crystalline aluminosilicate material, such as a faujasite, mordenite, a Y-type aluminosilicate material, cation-exchanged aluminosilicate material, and ultrastable, large-pore crystalline aluminosilicate material. A large-pore crystalline aluminosilicate material is one that has pores sufficiently large to permit the passage therethrough of benzene molecules and larger molecules into the aluminosilicate material and the passage therefrom of the various molecules of the products formed therein. The pore diameter of such pores are at least 6 A and preferably in excess of 8 A. The large-pore crystalline aluminosilicate material may be present in an amount of about 1 to about 50 weight percent, based on the weight of the support.

Mordenite is the preferred large-pore crystalline aluminosilicate material. While mordenite is naturally occurring, a synthetic mordenite known as Zeolon has become available commercially from the Norton Company. Zeolon-H is the hydrogen form of this synthetic mordenite. Mordenite is characterized by its high silicon-to-aluminum ratio of about 5:1 and its crystal structure. The composition of mordenite, as given in Kirk-Othmer, ENCYCLOPEDIA OF CHEMICAL TECHNOLOGY, Vol. 12, page 297, is $(Ca\ Na_2)\ Al_2Si_9O_{22}6H_2O$. The proposed structure is one in which the basic building block is a tetrahedron consisting of one silicon or aluminum atom surrounded by four oxygen atoms. The crystal is made up of chains of 4- and 5-membered rings of these tetrahedra. These 4- and 5-membered rings are believed to give to the structure its stability. The chains are linked together to form a network having a system of large parallel channels interconnected by small cross channels. Rings of 12 tetrahedra form the large channels. Other synthetic zeolites also have such 12-membered rings, but they have interconnected cages, whereas the mordenite has parallel channels of uniform diameter. For example, synthetic faujasite, which has the formula $Na_2Al_3Si_4O_{14}$, is characterized by a 3-dimensional array of pores which consist of 12-13 A cages interconnected through 8-9 A windows.

Preferably, the large-pore crystalline aluminosilicate material that is employed in the catalytic composition of the present invention is a cation-exchanged aluminosilicate material, that is, the alkali metal cations of the aluminosilicate material have been replaced by other cations. Cations that are suitable for replacing the alkali metal cations of an aluminosilicate material are magnesia, the rare earths, zinc, cadmium, platinum, manganese, hydrogen ions, and precursors of hydrogen ions, such as ammonium ions, and combinations of such ions. Cation-exchange techniques are well known to those skilled in the art and will not be described herein.

Embodiments of the catalytic composition of the present invention may be prepared by catalyst-preparation techniques that are well known to those skilled in the art. If the catalyst is to comprise a Group VIII noble metal, such as platinum, a halide, and a suitable support, such as alumina, the alumina may be formed in suitable extrudates or pellets, which may then be impregnated with one or more solutions of the platinum and the halide. On the other hand, if the catalyst support is to comprise an aluminosilicate material and alumina, finely-divided aluminosilicate material may be stirred into an alumina sol, a suitable non-halogen Group VIII metal compound, such as, for example, $(NH_3)_2Pt(NO_2)_2$, may be added to the sol, the sol mixture may be co-gelled by addition of dilute ammonia, and the resulting solid may be dried and calcined. Another way of preparing the catalyst is by mixing finely-divided aluminosilicate material into the alumina sol as above, gelling the sol by the addition of dilute ammonia to produce a gel, which is then dried and pelleted. The pellets are calcined, cooled, and then impregnated with a Group-VIII-metal solution. On the other hand, the catalyst can be prepared by blending an alumina hydrogel and a finely-divided aluminosilicate material, adding to the resultant blend a solution of the Group VIII noble metal, and thoroughly blending the mixture. The resulting gelled mixture is then dried, pelleted, and the pellets calcined. Suitable drying conditions for use in the various catalyst manufacturing methods include a temperature in the range of 200° to about 400°F. for a period of time of about 5 to about 30 hours. Suitable calcination conditions include a temperature of about 900° to about 1,500°F. for a time of about 2 to about 20 hours. Preferred drying and calcining conditions are a temperature of about 250°F. for about 16 hours and a temperature of about 1,000°F. for about 6 hours, respectively. The small amount of technetium may be incorporated into any of the embodiments of the catalytic composition of the present invention by impregnating the catalyst composite with a solution of a compound containing technetium, e.g., $(NH_4)_2TcO_4$. The catalyst composite is then dried and calcined as above.

If the catalytic composition of the present invention is to contain an element of Group VIA of the Periodic Table, for example, chromium, the catalyst may be prepared in several ways. For example, the catalyst can be made by impregnating the catalytically active alumina with an aqueous solution of either chromium nitrate, ammonium chromate, chromic acid, or ammonium dichromate. The chromium-containing alumina support can then be impregnated with a suitable aqueous solution of a technetium compound. On the other hand, the catalyst can be prepared through the formation of a chromia-alumina aerogel. Ethylene oxide is added to a solution of aluminum chloride, chromic chloride, and glycerol. The catalyst may also be prepared by impregnating alumina with an aqueous solution of chromium nitrate. Moreover, the catalyst may be prepared by co-precipitation employing solutions of chromium acetate and sodium aluminate. The alkaline promoter compound or element, if one is to be employed, may be added prior to co-gelling or co-precipitation of the chromia and the alumina. The technetium may be introduced into the catalyst composite by impregnating the alumina together with other components with a solution of a suitable technetium compound, such as $(NH_4)_2TcO_4$.

The methods of catalyst preparation that are described hereinabove are not the only ways of preparing the catalytic composition of the present invention and, therefore, this summary of preparation methods is not intended to exclude other methods which are not described herein.

When the catalytic composition of the present invention comprises a Group VIII noble metal and a support of alumina, it may also contain a halide, preferably, chlorine. The halide may be present in an amount of about 0.05 to about 2 weight percent, if the support does not comprise an aluminosilicate material. When the support of the catalytic composition comprises alumina and an aluminosilicate material, the concentration of halide should be less than 1 weight percent.

If the catalytic composition of the present invention contains as the component having hydrogenation-dehydrogenation activity and dehydrocyclization activity the oxides of chromium, the catalyst may also contain a member selected from the group consisting of an oxide of an alkali metal, an oxide of an alkaline earth metal, and mixtures thereof. Such a member may be present in an amount of about 0.1 to about 5 weight percent, calculated as the oxide and based on the weight of the catalytic composition.

The catalytic composition of the present invention may also contain a small amount of rhenium as a promoter. This small amount will not exceed 2 weight percent, based on the weight of the catalyst.

The catalytic composition of the present invention may be used in a process for the reforming of petroleum hydrocarbon streams. Therefore, according to the present invention, there is provided a process for reforming a petroleum hydrocarbon feedstock to obtain products that have very-high-octane numbers and that can be used as blending components for gasoline.

The new process can be carried out in any of the conventional types of equipment known to the art. One may, for example, employ catalysts in the form of pills, pellets, granules, broken fragments, or various special shapes, disposed as a fixed bed within a reaction zone, and the charging stock may be passed therethrough in the vapor phase, and in either upward or downward flow. Alternatively, the catalysts may be in a suitable form for use in moving beds, in which the charging stock and the catalyst are preferably passed in countercurrent flow; or in fluidized-solid processes, in which the charging stock is passed upward through a turbulent bed of finely-divided catalyst; or in the suspensoid process, in which the catalyst is slurred in the charging stock and the resulting mixture is conveyed into the reaction zone. The preferred fixed-bed process is exemplified by Ultraforming (PETROLEUM ENGINEER, Vol. XXVI, No. 4, April 1954, at page C-35). The reaction products from any of the foregoing processes are separated from the catalyst and fractionated to recover the various components thereof. The hydrogen and unconverted materials are recycled as desired; the excess hydrogen that is produced in the reformer conveniently being utilized in the hydrodesulfurization of the feed, if such desulfurization is required.

The improved process of this invention may be used to reform a feedstock which is a member selected from the group consisting of a virgin naphtha, a cracked naphtha, a hydrocarbon fraction boiling in the gasoline boiling range, mildly-reformed naphthas, and mixtures thereof. A naphtha will exhibit a boiling range of about 70° to about 500°F., preferably, about 180° to about 400°F. The gasoline boiling range comprises temperatures of about 120° to about 420°F., preferably about 140° to about 380°F. Since many of the above feedstocks may contain appreciable amounts of nitrogen and sulfur compounds, which are deleterious to those embodiments of the catalytic composition of the present invention which contain a Group VIII noble metal, it is preferred that such feedstocks be subjected to a suitable hydrodesulfurization and/or hydrodenitrogenation treatment, such as hydrofining, prior to being passed over the catalyst containing the Group VIII noble metal. In this way, both the nitrogen and sulfur levels of the feed are reduced to tolerable limits prior to being contacted with the catalyst containing the Group VIII noble metal.

Desirable feedstocks may contain substantial amounts of paraffins. In fact, such feedstocks may contain paraffins in the amount of about 5 to about 100 volume percent. It is suggested that where naphthenes are present in the petroleum hydrocarbon stream to be reformed, the ratio of paraffins to five-carbon-member-ring naphthenes should be at least 6-to-1, when employing the chromia-containing catalysts.

Suitable reforming conditions are employed in the process of the present invention. The conditions, to some extent, depend on which embodiment of the catalytic composition of the present invention is employed. If the catalytic composition comprises a Group VIII noble metal and alumina, the conditions comprise an average catalyst bed temperature of about 800° to about 1,050°F., a total pressure of about 50 to about 1,000 psig, a hydrogen-to-hydrocarbon ratio of about 1,000 to about 12,000 standard cubic feet of hydrogen per barrel of hydrocarbons (SCFB), and a liquid hourly space velocity (LHSV) of about 0.1 to about 10 volumes of hydrocarbon per hour per volume of catalyst. Preferred operating conditions to be used with such an embodiment of the catalytic composition of the present invention comprise an average catalyst bed temperature of about 800° to about 950°F., a total pressure of about 50 to about 400 psig, a hydrogen-to-hydrocarbon ratio of about 2,000 to about 6,000 SCFB, and a LHSV of about 1 to about 5 volumes of hydrocarbon per hour per volume of catalyst.

If the embodiment of the catalytic composition comprises a metal of Group VIA of the Periodic Table, a suitable support, and technetium, suitable operating conditions comprise an average catalyst bed temperature of about 900° to about 1,050°F., a total pressure of about 0 psig to about 100 psig, a hydrogen-tohydrocarbon ratio of about 500 to about 10,000 SCFB, and a LHSV of about 0.1 to about 5 volumes of hydrocarbon per hour per volume of catalyst. Preferred operating conditions that may be employed with such an embodiment of the catalytic composition comprise an average catalyst bed temperature of about 920° to about 1,000°F., a total pressure of about 20 to about 45 psig, a hydrogen-to-hydrocarbon ratio of about 1,000 to about 5,000 SCFB, and a LHSV of about 0.2 to about 5 volumes of hydrocarbon per hour per volume of catalyst.

Unwanted products in the reforming of petroleum hydrocarbon streams are light hydrocarbon gases and coke. Compounds, such as polynuclear aromatics, result in coke. As the operation progresses, a substantial amount of coke accumulates on the surface of the catalyst, resulting in an increasingly rapid rate of catalyst deactivation. Consequently, the coke must be removed from the surface. Such coke removal may be accomplished through a coke-burn treatment wherein the coke-containing catalyst is contacted with an oxygen-containing gas at selected temperatures. Typically, the gas will contain oxygen within the range of about 1 volume percent to about 21 volume percent. The concentration of oxygen in the gas should be maintained at a level which will not result in the production of temperatures that are in excess of 1,100°F., preferably, in excess of 1,050°F. Each of the embodiments of the catalytic composition of the present invention are capable of withstanding the conditions employed in the regeneration and are capable of being regenerated.

The following examples are presented for the purpose of illustration only and are not intended to limit the scope of the present invention.

EXAMPLE I

A catalyst containing technetium on a catalytically active alumina was prepared. The alumina was a commercially-prepared gamma-alumina having a very high purity. It was manufactured by the American Cyanamid Company. A 25-gram portion of the alumina was ground to pass through a 14-mesh screen (U.S. Sieve Series), but to be retained on a 20-mesh screen (U.S. Sieve Series). This pulverized alumina was impregnated with 40 ml. of a solution that contained 0.30 gram of $(NH_4)_2TcO_4$. The impregnated material was dried in static air at ambient temperature and was calcined subsequently for 1 hour in static air at a temperature of 842°F. (450°C.). This catalyst, identified hereinafter as Catalyst A, was prepared to contain 0.6 weight percent technetium.

Catalyst A was employed to convert an ASTM-grade n-heptane obtained from the Phillips Petroleum Company. This feedstock contained 0.88 weight percent methylhexanes and 0.86 weight percent methylcyclohexane.

The test was conducted in a fully-automated bench-scale test unit. The reactor had an inside diameter of ⅝ inch and was 22 inches in length. A ⅛-inch co-axial thermowell extended up through the reactor from the bottom of the reactor. A 6.5-inch catalyst bed was formed in the annular space between the reactor wall and the thermowell. A 10-cc. sample of catalyst was employed. Conventional small-scale product-recovery equipment was employed. Gas-chromatographic methods were used to analyze the total product collected over the specified period of time. This unit was also employed in the tests discussed in the examples presented hereinafter.

In this test, the normal-heptane feedstock was passed over Catalyst A at a LHSV of 1.0 volume of hydrocarbon per hour per volume of catalyst. The average catalyst bed temperature was 920°F. The product sample obtained for analytical purposes was accumulated over a period of time extending from the second hour of the test to the 17th hour. It was found that 35.1 percent conversion was obtained during this test, the normal-heptane having been converted to 23.1 percent toluene and 12 percent cracked products.

These data demonstrate that a technetium-on-alumina catalyst does provide some reforming capability, but these data do not suggest that such a catalyst is a superior reforming catalyst.

EXAMPLE II

A typical commercially-prepared platinum-containing reforming catalyst was employed in the preparation of a technetium-promoted platinum-containing reforming catalyst. The typical platinum-containing reforming catalyst is identified hereinafter as Catalyst B. It was manufactured by the American Cyanamid Company and contained 0.76 weight percent platinum and 0.81 weight percent chloride on a gamma-alumina.

Catalyst B, ground to pass through a 14-mesh screen (U.S. Sieve Series), but to be retained on a 35-mesh screen (U.S. Sieve Series), was tested for its conversion of a desulfurized Mid-Continent naphtha, hereinafter identified as Feedstock A. Selected properties of Feedstock A are presented hereinbelow in Table I. Test conditions, as well as pertinent data, for this test are presented in Table II. Accumulated samples of product from the test were obtained for the period of time elapsing from the end of the initial hour shown in the Table II to the end of the final hour listed there.

TABLE I

| FEEDSTOCK PROPERTIES | | | |
|---|---|---|---|
| Feedstock | A | B | C |
| Gravity, °A.P.I. | | 49.1 | |
| ASTM Distillation, °F. | | | |
| IBP | 177 | | |
| 5% | 201 | 75 | 76 |
| 10 | 211 | | |
| 30 | 231 | | |
| 50 | 251 | | |
| 70 | 271 | | |
| 90 | 294 | | |
| 95 | 304 | 408 | 396 |
| EBP | 328 | | |
| Unleaded Research Octane No. | | 73.4 | |
| Type Analysis, Vol.% | | | |
| Paraffins | 49.6 | 47.3 | |
| Naphthenes | 38.4 | 11.4 | 52.0 |
| Aromatics | 12.0 | 41.3 | 48.0 |

A 20-gram portion of fresh Catalyst B was impregnated with 20 ml. of a solution that contained 0.04 gram of $(NH_4)_2TcO_4$. The impregnated material was dried in static air at ambient temperature and then calcined for one hour in static air at a temperature of 752°F. (400°C.). This catalyst, hereinafter identified as Catalyst C, was prepared to contain 0.76 weight percent platinum, 0.81 weight percent chloride, and 0.1 weight percent technetium on gamma-alumina.

Catalyst C, as 14-mesh-to-35-mesh material, was employed to convert Feedstock A. As was done with Catalyst B, two samples of accumulated product were obtained and analyzed by means of gas chromatographic methods. The pertinent test conditions and data are presented in Table II.

promoted with technetium. In addition, the results demonstrate that the technetium-promoted catalyst, Catalyst C, can be regenerated successfully. This is demonstrated by the data which indicate that an unleaded research octane number of over 99 could be obtained with the regenerated catalyst at twice the LHSV

TABLE II

| Test No. | 2 | 2 | 3 | 3 | 3 | 3 |
|---|---|---|---|---|---|---|
| Catalyst | B | B | C | C | C* | C* |
| Feedstock | A | A | A | A | A | A |
| Products-Composite: | | | | | | |
| Initial hour | 2 | 25.5 | 2 | 25.5 | 2 | 25.5 |
| Final hour | 18 | 42 | 18 | 42 | 18 | 42 |
| Pressure, psig | 60 | 60 | 60 | 60 | 60 | 60 |
| Inlet Tempt., °F. | 908 | 906 | 894 | 894 | 903 | 903 |
| Average catalyst bed temp., °F. | 902 | 903 | 881 | 881 | 886 | 885 |
| LHSV | 1 | 1 | 1 | 1 | 2 | 2 |
| Hydrogen added, SCFB | 2,000 | 2,000 | 2,000 | 2,000 | 2,000 | 2,000 |
| Unleaded Research Octane No. | 100.4 | 97.7 | 101.0 | 101.0 | 99.4 | 96.9 |
| Aromatics, vol.% | 54.1 | 52.4 | 56.9 | 55.6 | 57.6 | 53.2 |
| $C_{5}$-Yield, vol.% | 75.5 | 80.0 | 77.4 | 79.0 | 79.6 | 80.4 |
| Coke, wt.% on feed | | 0.12 | | 0.051 | | 0.048 |

* REGENERATED ONE TIME

After 44 hours on stream, the flow of the hydrocarbon feedstock was terminated and the catalyst was regenerated. Regeneration of the catalyst was performed at essentially atmospheric pressure. The test system was first purged with bottled nitrogen for about 30 minutes at a nitrogen flow rate of about 1 cubic foot per hour. Then a slow flow of air was introduced into the reactor in such an amount that the maximum temperature at any point in the catalyst bed did not exceed 950°F. After the resultant "flame-front" had passed through the entire catalyst bed, pure oxygen was passed over the catalyst for 1 hour at an average catalyst bed temperature of 900°F. and a flow rate of 0.5 cubic foot per hour. An 8-cc. portion of chlorine gas was added to the flowing oxygen. Subsequent to the injection of the chlorine gas, oxygen flow was continued through the catalyst bed for an additional 10 minutes. Then the bed was purged with bottled nitrogen for a period of about 30 minutes at a flow rate of 1 cubic foot per hour and the average catalyst bed temperature was brought down to a temperature of about 850°F. Bottled methane gas was then passed through the catalyst bed for a period of about 15 minutes at a flow rate of about 0.5 cubic foot per hour and an average catalyst bed temperature of about 850°F. The unit was then pressured with bottled hydrogen to a pressure of 60 psig and hydrogen flow was permitted to line out at a flow rate of about 2,000 SCFB. The catalyst was again tested with Feedstock A at the conditions shown in Table II. Also presented in Table II are the results of the test.

Comparison of the results obtained with Catalyst B to the results obtained with Catalyst C indicates that Catalyst C, the technetium-promoted platinum-containing catalyst, is more active, i.e., a higher percent of aromatics was obtained at a lower average catalyst bed temperature for Catalyst C than for Catalyst B. Reduced coke formation was obtained with the catalyst that was and that an increased amount of aromatics could also be obtained at this higher LHSV.

EXAMPLE III

An alkalized chromium-oxide-on-alumina catalyst was prepared. A 900-gram portion of large-pore-diameter Aero-100 alumina, manufactured by the American Cyanamid Company, was impregnated with a one-liter solution which contained 165.0 grams of $(NH_4)_2Cr_2O_7$ and 15.0 grams of $K_2CO_3$ dissolved in distilled water. The impregnated material was dried in static air for 24 hours at ambient temperature and then calcined in static air for 2 hours at a temperature of 752°F. (400°C.). This catalyst, identified hereinafter as Catalyst D, was prepared to contain 1.0 weight percent $K_2O$ and 9.8 weight percent $Cr_2O_3$ on catalytically active alumina. It was found to pass through a 14-mesh screen (U.S. Sieve Series), but to be retained on a 35-mesh screen (U.S. Sieve Series).

A 50-gram portion of the air-dried Catalyst D was ground to pass through a 16-mesh screen (U.S. Sieve Series), but to be retained on a 35-mesh screen (U.S. Sieve Series). The pulverized material was impregnated with 25 ml. of a solution that contained 0.2 gram of $(NH_4)_2TcO_4$. The impregnated material was dried in static air at ambient temperature and was calcined subsequently for 2 hours in static air at a temperature of 752°F. (400°C). This catalyst, identified hereinafter as Catalyst E, was prepared to contain 0.5 weight percent technetium.

Each catalyst was tested for its ability to convert mildly-reformed naphthas. The operating conditions, as well as pertinent test data, are presented in Table III hereinbelow. Each of the catalysts was regenerated twice. These regenerations were similar to those described in Example II, with the following exceptions:

The burning of the coke with the slow air flow was initiated at a temperature of 900°F. and was conducted to provide a flame-front temperature that did not exceed 1,000°F.; no chlorine gas or flowing oxygen treat was used; immediately after the purge of the system with nitrogen, the unit was pressured with bottled hydrogen. The mildly-reformed naphthas, identified hereinafter as Feedstock B and Feedstock C, had the properties listed hereinabove in Table I.

TABLE III

| Test No. | 4 | 4 | 5 | 5 | 5 |
|---|---|---|---|---|---|
| Catalyst | D | D** | E | E* | E** |
| Feedstock | B | C | B | B | C |
| Products-Composite: | | | | | |
| Initial hour | 4 | 1 | 2 | 2 | 2 |
| Final hour | 21 | 15 | 17 | 19 | 19 |
| Pressure, psig | 30 | 30 | 60 | 60 | 60 |
| Inlet Temp., °F. | | | | | |
| Average Catalyst Bed Temp., °F. | 974 | 984 | 966 | 974 | 977 |
| LHSV | 0.5 | 0.5 | 1.0 | 0.5 | 0.5 |
| Hydrogen added, SCFB | 2,000 | 2,000 | 2,000 | 2,000 | 2,000 |
| Aromatics, vol.% | 51.3 | 56.2 | 52.3 | 55.1 | 58.1 |
| $C_5^+$-Yield, vol.% | 82.0 | 81.2 | 84.9 | 80.7 | 80.5 |
| Coke, wt.% on feed | 0.36 | 0.35 | 0.10 | 0.15 | 0.21 |

* REGENERATED ONE TIME
** REGENERATED TWO TIMES

The results presented in Table III indicate that the technetium-promoted, alkalized chromium-oxides-on-alumina catalyst, Catalyst E, provided a higher concentration of aromatics in the product at a slightly lower average catalyst bed temperature with at least comparable $C_5^+$-yields. Moreover, the data show that a coke reduction was obtained with the catalyst containing technetium. The data also demonstrate the regenerability of the catalyst.

What is claimed is:

1. A catalytic composition for the reforming of a petroleum hydrocarbon stream, which catalytic composition comprises as a component having hydrogenation-dehydrogenation activity and dehydrocyclization activity an oxide of chromium, a suitable support comprising catalytically active alumina, and as a promoter a small amount of an oxide of technetium.

2. The catalytic composition of claim 1 wherein said small amount of technetium is within the range of about 0.01 weight percent to about 2 weight percent, based on the total weight of said catalytic composition.

3. The catalytic composition of claim 1, which catalytic composition comprises also a second member selected from the group consisting of an oxide of an alkali metal, an oxide of an alkaline earth metal, and mixtures thereof.

4. The catalytic composition of claim 2 wherein said oxide of chromium are present in an amount within the range of about 5 weight percent to about 25 weight percent, calculated as $Cr_2O_3$ and based on the weight of said catalytic composition.

5. The catalytic composition of claim 2, which catalytic composition comprises also a second member selected from the group consisting of an oxide of an alkali metal, an oxide of an alkaline earth metal, and mixtures thereof.

6. The catalytic composition of claim 4, which catalytic composition comprises also a second member selected from the group consisting of an oxide of an alkali metal, an oxide of an alkaline earth metal, and mixtures thereof, said second member being present in an amount within the range of about 0.1 weight percent to about 5 weight percent, calculated as the oxide and based on the weight of said catalytic composition.

* * * * *

PO-1050
(5/69)

UNITED STATES PATENT OFFICE
CERTIFICATE OF CORRECTION

Patent No. 3,846,342   Dated November 5, 1974

Inventor(s) Albert L. Hensley, Jr., and Thomas D. Nevitt

It is certified that error appears in the above-identified patent and that said Letters Patent are hereby corrected as shown below:

Column 5, Line 66,   "slurred" should be -- slurried --.

Column 10, Line 48,   "found" should be -- ground --.

Signed and sealed this 3rd day of June 1975.

(SEAL)
Attest:

RUTH C. MASON
Attesting Officer

C. MARSHALL DANN
Commissioner of Patents
and Trademarks